Patented Sept. 12, 1939

2,172,712

UNITED STATES PATENT OFFICE 2,172,712

AZO DYESTUFFS

Hans Roos, Leverkusen-I. G.-Werk, Germany, assignor to General Aniline Works, Inc., New York, N. Y., a corporation of Delaware No Drawing. Application June 5, 1935, Serial No. 25,181. In Germany June 27, 1934

6 Claims. (Cl. 260—160)

The present invention relates to new azodyestuffs, more particularly it relates to azodyestuffs which may be represented by the general formula

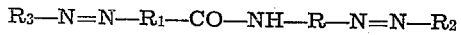

$R_3$—N=N—$R_1$—CO—NH—R—N=N—$R_2$

In the said general formula —NH—R—N= stands for the radical of a meta or para diamine of the benzene series, $R_1$ stands for a radical of the benzene series, $R_2$ stands for the radical of a non-diazotizable yellow component of the group consisting of aromatic o-hydroxy-carboxylic acids and 1-aryl-5-pyrazolone-3-carboxylic acids, such as salicylic acid, cresotinic acids, 1-phenyl-(or tolyl-, or chlorophenyl)-5-pyrazolone-3-carboxylic acid, and $R_3$ stands for the radical of an N-substituted aminonaphthol-sulfonic acid or of a 1-aryl-5-pyrazolone-3-carboxylic acid which may bear any substituents in the 1-aryl nucleus, such as N-alkyl-, N-aryl-, N-acyl- or N-aroyl-2-amino-5-naphthol-7-sulfonic acid.

My new dyestuffs are obtainable by diazotizing a nitroaroyl-m- or p-arylenediamine, coupling with one equimolecular proportion of a non-diazotizable yellow component of the group consisting of aromatic o-hydroxy-carboxylic acids and 1-aryl-5-pyrazolone-3-carboxylic acids, reducing the nitro group to the amino group, diazotizing and coupling with one equimolecular proportion of an aminonaphtholsulfonic acid substituted in the amino group or of a 1-aryl-5-pyrazolone-3-carboxylic acid.

In order to obtain the monoazo dyestuff which is formed as an intermediate product, it is, of course, also possible not to start from a nitroaroyl-m- or p-diamine, but instead first to couple a nitroaroyl amine with one of the yellow components mentioned in the first coupling process, to reduce the nitro group of the monoazo dyestuff and to condense the amino group thus formed with a nitroaroyl chloride.

In form of their alkali metal salts my new dyestuffs are generally yellow to red powders. In general they dye the vegetable fiber yellow to red shades which are easily dischargeable in the neutral or alkaline process. When the second coupling component of the said dyestuffs contains a diazotizable amino group, they can be diazotized and further developed in the known manner, either in substance or on the fiber. The dischargeability of the dyeings aftertreated in the said manner is maintained.

The invention is illustrated by the following examples without being limited thereto:

Example 1.—25.7 parts of p-nitrobenzoyl-p-phenylenediamine are suspended in 1000 parts of water and 28 parts by volume of 10-N-hydrochloric acid solution, and diazotized with 7 parts of sodium nitrite. The diazo compound is cooled to 0° C. and introduced into a solution of 20.5 parts of 1-phenyl-5-pyrazolone-3-carboxylic acid to which 28 parts of crystalline sodium carbonate have been added, the temperature of the said solution being also 0° C. The temperature of the mixture is then maintained for some hours at 0° C. until the coupling is complete. The mixture is then heated to 70° C., whereupon a concentrated solution of 32 parts of sodium sulfide is added. The temperature is then maintained for about one hour while stirring. The aminobenzoylated monoazo dyestuff is separated by the addition of about 10% of common salt. The dyestuff is then dissolved in 2000 parts of hot water, 7 parts of sodium nitrite are added, and the whole is introduced into a mixture of ice, water and 35 parts of hydrochloric acid of 19.5° Bé. After about one hour's stirring, the diazotization is complete, whereupon a solution of 20 parts of 1-phenyl-5-pyrazolone-3-carboxylic acid in 36 parts of crystalline sodium carbonate dissolved in a small quantity of water is introduced into the reaction mixture. The formation of the dyestuff is complete within a short time, whereupon the dyestuff having in the free state the following formula:

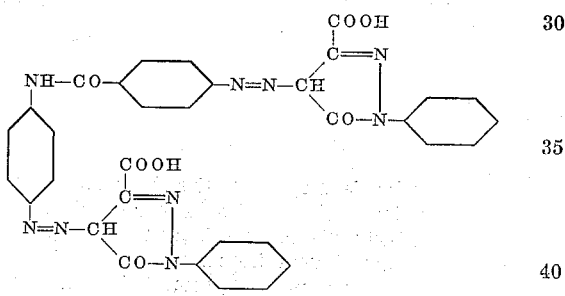

is isolated in the known manner. It dyes cotton orange shades which are very easily dischargeable in the neutral or alkaline process.

If 1-(m-nitrophenyl)-5-pyrazolone-3-carboxylic acid is employed in the second coupling, and if the dyestuff formed is reduced at 80° C. with 40 parts of sodium sulfide, a dyestuff is obtained which also dyes cotton orange shades and which can be further diazotized and developed on the fiber in the known manner. If developed with 1-phenyl-3-methyl-5-pyrazolone, yellow orange shades are obtained; if developed with 2-naphthol, red orange are obtained; both shades are very clear and very easily dischargeable in the neutral or alkaline process. If 1-(p'-nitrophenyl)-5-pyrazolone-3-carboxylic acid is employed in the second coupling, and if the dyestuff is subsequently reduced, a dyestuff is obtained, which, on developing, dyes cotton brown red shades which are also distinguished by their outstanding dischargeability.

*Example 2.*—28 parts of the monoazodyestuff prepared in the known manner either by diazotizing p-nitraniline, coupling with salicylic acid and subsequent reduction, or by diazotizing acetyl-p-phenylenediamine, coupling with salicylic acid and subsequent saponification, are dissolved in about 500 parts of water. The temperature is then raised to 70–71° C. and, while maintaining the solution alkaline, p-nitrobenzoylchloride is continuously added until a test portion taken from the mixture is no longer diazotizable. The precipitated condensation product is then reduced in the manner described in Example 1 with sodium sulfide, diazotized and coupled with 20 parts of 1-phenyl-5-pyrazolone-3-carboxylic acid. The dyestuff obtained having in the free state the following formula:

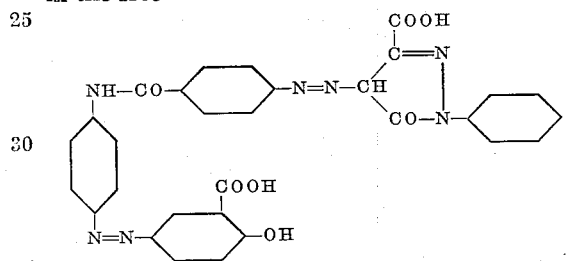

dyes cotton reddish yellow shades which are very easily dischargeable in the neutral or alkaline process.

If in the first coupling the salicylic acid is replaced by o-cresotinic acid, a dyestuff exerting similar properties is obtained.

If 1-(m-aminophenyl)-5-pyrazolone-3-carboxylic acid is employed in the second coupling, there is obtained a dyestuff having in the free state the following formula:

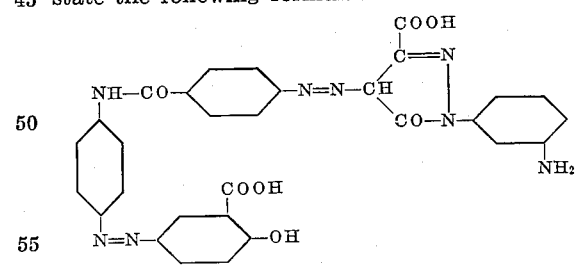

which can be developed on the fiber and which exhibits yellower shades than those obtained according to Example 1. The shades undergo the same variation if p-aminobenzoyl J-acid is employed in the second coupling. This dyestuff corresponds in its free state to the following formula:

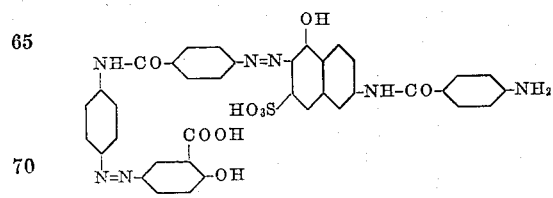

In Example 1 a yellowish red was obtained on the fiber after the treatment with 2-naphthol, whereas the dyestuff obtained according to this example yields reddish orange shades. If the p-amino-benzyl J-acid is replaced by the p-aminobenzoyl-methyl J-acid, the shades are still more displaced towards the yellow side. All the dyestuffs set out in this example are very easily dischargeable in the neutral or alkaline process.

When using for the condensation instead of the p-nitro-benzoylchloride, employed in this example, m-nitrobenzoylchloride, there are obtained with 1-phenyl-5-pyrazolone-3-carboxylic acid and with 1-(m-amino)-phenyl-5-pyrazolone-3-carboxylic acid more greenish yellow dyestuffs which can be likewise excellently discharged, both with a neutral and an alkaline discharge paste.

*Example 3.*—25.7 parts of p-nitrobenzoyl-p-phenylenediamine are diazotized in the manner described in Example 1 and coupled with 39 parts of 1-(6'-sulfo-2'-naphthyl)-5-pyrazolone-3-carboxylic acid ester. The reduction is also carried out in the manner described in Example 1. After diazotizing and coupling with 35 parts of benzoyl J-acid, a dyestuff is obtained which dyes cotton scarlet shades by the direct method. The dyestuff having in the free state the following formula:

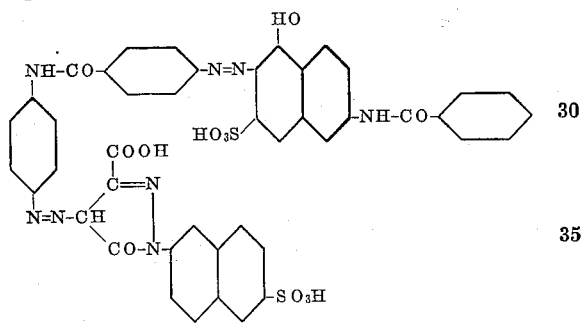

is outstandingly dischargeable.

The disazo dyestuffs obtained with m-aminophenyl-5-pyrazolone-3-carboxylic acid or with p- or m-aminobenzoyl J-acid exhibits nearly the same dyeing properties; they are somewhat redder than those prepared according to Example 1.

When substituting the p-nitrobenzoyl-p-phenylenediamine by the m- or p-nitrobenzoyl-m-phenylenediamine there are obtained dyestuffs of similar properties.

I claim:

1. Azodyestuffs of the general formula $R_3\text{—}N\text{=}N\text{—}R_1\text{—}CO\text{—}NH\text{—}R\text{—}N\text{=}N\text{—}R_2$ wherein —NH—R—N= stands for the radical of a meta or para diaminobenzene, $R_1$ for a benzene radical, $R_2$ for the radical of a non-diazotizable yellow component of the group consisting of o-hydroxy-benzene-carboxylic acids and 1-aryl-5-pyrazolone-3-carboxylic acids, and $R_3$ for the radical of a 1-aryl-5-pyrazolone-3-carboxylic acid, dyeing the vegetable fiber yellow to red shades of good dischargeability, both in the neutral or alkaline process.

2. The dyestuff having in the free state the following formula:

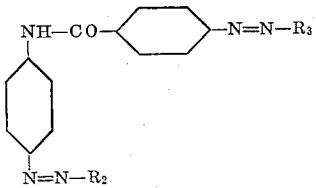

wherein $R_2$ stands for the radical of a non-diazotizable yellow component of the group consisting of o-hydroxy-benzene-carboxylic acids and 1-aryl-5-pyrazolone-3-carboxylic acids, and $R_3$ for the radical of a 1-aryl-5-pyrazolone-3-carboxylic acid, dyeing the vegetable fiber yellow to red shades of good dischargeability, both in the neutral or alkaline process.

3. The dyestuff having in the free state the following formula:

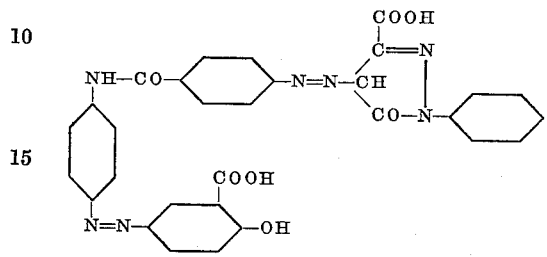
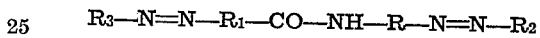

dyeing the vegetable fiber reddish yellow shades of good dischargeability, both in the neutral or alkaline process.

4. Azodyestuffs of the general formula $$R_3-N=N-R_1-CO-NH-R-N=N-R_2$$

wherein —NH—R—N= stands for the radical of a meta or para diaminobenzene, $R_1$ for a benzene radical, $R_2$ for the radical of a non-diazotizable ortho-hydroxy-benzene-carboxylic-acid, and $R_3$ for the radical of a 1-aryl-5-pyrazolone-3-carboxylic acid, dyeing the vegetable fiber yellow to red shades of good dischargeability, both in the neutral or alkaline process.

5. The dyestuff having in the free state the following formula:

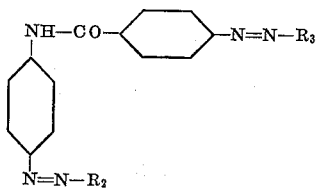

wherein $R_2$ stands for the radical of a non-diazotizable ortho-hydroxy-benzene-carboxylic acid and $R_3$ for the radical of a 1-aryl-5-pyrazolone-3-carboxylic acid, dyeing the vegetable fiber yellow to red shades of good dischargeability, both in the neutral or alkaline process.

6. The dyestuff having in the free state the following formula:

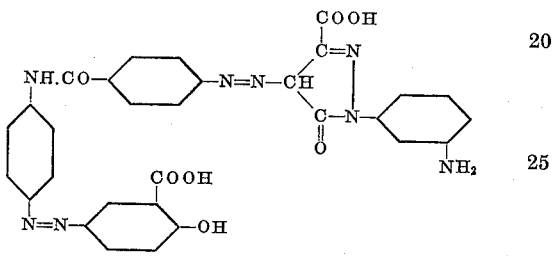

dyeing the vegetable fibre reddish-yellow shades which can be diazotized and developed on the fibre.

HANS ROOS.